R. COOK.
Plow-Fender.
No. 63,140. Patented Mar 26, 1867.
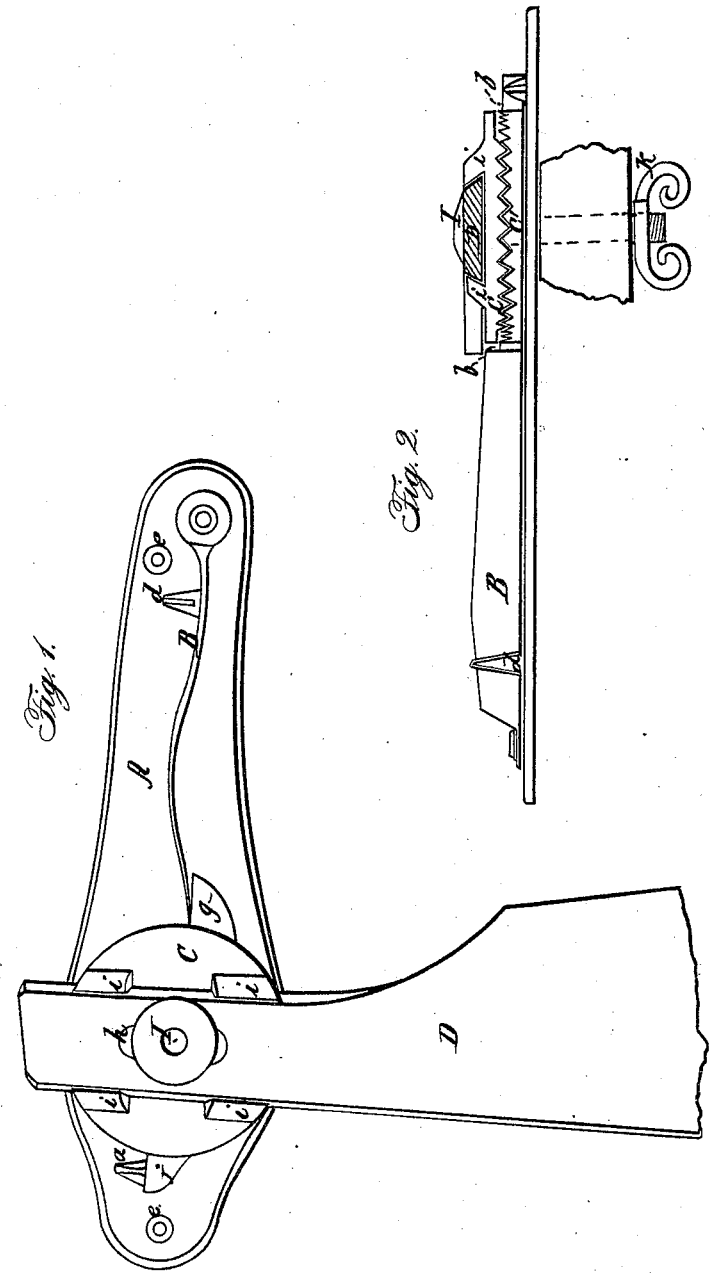
Witnesses:
S. E. Peck
A. L. Peck
Inventor:
Robert Cook
by his atty
H. P. K. Peck

United States Patent Office.

ROBERT COOK, OF FRANKLIN, OHIO.

Letters Patent No. 63,140, dated March 26, 1867.

IMPROVEMENT IN FENDERS FOR CORN PLOUGHS.

The Schedule referred to in these Letters Patent and making part of the same.

TO ALL WHOM IT MAY CONCERN:

Be it known that I, ROBERT COOK, of Franklin, in Warren county, in the State of Ohio, have invented a new and useful Improvement in Fenders for Corn Ploughs; and I do hereby declare that the following is a full and exact description thereof, reference being had to the accompanying drawings and to the letters of reference marked thereon.

Figure 1 represents a side view of my invention.

Figure 2 is a top view, representing a section of the plough-beam and screw-bolt by which my fender i secured.

The object of my invention is to provide a device, to be attached to the side of a plough-beam, for the protection of the growing corn from clods or earth, during the cultivation thereof by ploughing; and my invention consists in the combination of a shield or fender, with intermediate mechanism, fastened to the plough-beam, capable of adjustment and of yielding, to pass obstructions, as will be herein fully set forth.

In the accompanying drawings, which are made a part of this specification, A designates a metal plate, which I denominate the beam-plate. It may be made of cast iron, and is provided with lips $a$ $d$, upon its outer face, and also with screw-holes $e$ $e$, for fastening the plate to the side of the plough-beam. The curved spring B is riveted at one end to the beam-plate, and rests against the projecting lip $d$, as represented in the drawings. C and C' denote two metal disks. The inner faces of these disks are made with serrations or notches $b$ $b$, near their peripheries, for the purpose hereinafter described. The disk C', next the beam-plate A, has two ears, one at each opposite edge. The ear $f$ is held by spring B, which bears against the opposite ear $g$, in contact with the lip $a$, and serves to prevent the disk from turning around beyond this stop or lip $a$. The outer disk C is provided with projecting lugs $i$ $i$, between which the end of the fender D is placed. This fender or shield D widens out towards its lower end, and is furnished with a slot, $h$, through which the bolt I passes. By means of the slot the fender may be adjusted up or down to a proper position for the protection of the corn or other vegetable or grain being cultivated. The bolt I passes through the disks C C', plate A, and plough-beam, and retains the parts in position by the nut $k$. The edges of the disks C C' are made of greater thickness at the lower than upper parts thereof, for the purpose of giving to the fender D an inclination from a perpendicular. This feature of construction will cause the bottom or lower extremity of the fender to stand off some two or three inches from the land-side of the plough.

My invention is capable of being readily attached to and detached from ploughs of ordinary construction with great ease and facility. The beam-plate A is first secured on the land-side of the plough-beam by means of two or more wood screws; and then the disks C C' and fender D are brought into position for the bolt I to be inserted, which holds these latter devices in position against the beam-plate A. Before screwing up the nut $k$ tightly the fender will be adjusted to a proper height, so that its lower edge will follow, as the plough progresses, close to the surface of the ground, and the outer disk C will be adjusted upon the disk C', (with the teeth on the two disks meshing in the notches formed by the serrations,) so as to bring the fender D opposite to the front edge or extremity of the mould-board of the plough, as at that position or point the fender will most effectually protect the corn from being broken down or covered by clods or earth. When in use the fender moves along near the surface of the ground, between the corn row and plough; and, in the event of meeting with obstructions, instead of being broken by the resisting obstacle, the fender will move backwards in the arc of a circle, the two disks C and C' turning upon their axis, which is the bolt; and when the fender has passed over the obstruction the retracting spring B will force the disks around to their former position, where they will be stopped by the lip $a$ on the beam-plate. Of course the fender being secured, as described, to the outer face of disk C, it will necessarily partake of the same partially revolving action of the disks.

Having now fully described my invention, what I claim, and desire to secure by Letters Patent, is—

1. The yielding and adjustable fender D, attached to a plough-beam by mechanism, substantially as and for the purpose specified.

2. The construction of the disks C and C', for holding the fender D, operating substantially as and for the purpose described.

3. The combination of the fender D, disks C and C', with the beam-plate A and spring B, arranged substantially as and for the purpose described.

In testimony whereof I have hereunto set my hand this 2d day of

ROBERT COOK.

Witnesses:
  H. P. K. PECK,
  A. L. PECK.